Oct. 31, 1961 H. K. BAUMEISTER 3,007,086

MULTI-POSITION ELECTROMAGNETIC ACTUATOR

Filed April 17, 1959 4 Sheets-Sheet 1

Oct. 31, 1961 H. K. BAUMEISTER 3,007,086

MULTI-POSITION ELECTROMAGNETIC ACTUATOR

Filed April 17, 1959 4 Sheets-Sheet 4

United States Patent Office 3,007,086
Patented Oct. 31, 1961

3,007,086
MULTI-POSITION ELECTROMAGNETIC ACTUATOR

Heard K. Baumeister, Verbank, N.Y., assignor to International Business Machines Corporation, New York, N.Y., a corporation of New York Filed Apr. 17, 1959, Ser. No. 807,172
18 Claims. (Cl. 317—188)

This invention relates to actuators of the electromagnetic type and has for an object the provision of a multi-position electromagnetic actuator which is capable of high speed operation.

While the present invention is applicable to any application where multi-position electromagnetic actuators are employed, the invention is particularly applicable for the actuation of the moving pulleys or pressure rollers in the drive system of tape recorders. The pressure rollers of magnetic tape units are adapted to be actuated for movement of the tape into engagement with either a drive capstan or a stop capstan from an intermediate or neutral position. The tape is adapted to be transported through the unit at speeds in the order of one hundred inches per second. The present invention has enabled the tape speed to be increased about fifty percent without increasing the inter-record gap.

It is a further object of the invention to provide a high speed multi-position electromagnetic actuator of relatively simple and rugged construction.

In accordance with the present invention, there is provided a multi-position electromagnetic actuator having an arm pivoted between its ends to a support. An armature is pivoted intermediate its ends to the arm at a location spaced from the pivotal connection of the arm to the support. Two pairs of magnetic poles are arranged with respect to the armature so that one pair is disposed on either side of the armature. Means are provided for maintaining the armature in a diagonal position with one end thereof in engagement with one of the poles of each pair of magnetic poles to maintain the arm in a central position. Associated with the pairs of poles are electrical means which are selectively energized to move the armature into engagement with either pair of the pairs of poles so as to move the arm about its pivot in opposite directions to positions on either side of the central position.

More specifically, and in accordance with one form of the present invention, the pairs of magnetic poles each comprise a U-shaped core and the armature is maintained in its diagonal position by springs which engage the opposite ends of the armature at opposite sides thereof, the springs also engaging the corresponding poles.

More specifically, and in accordance with another form of the invention, the magnetic pole comprises individual cores each having an electrical coil. The electrical coils are adapted to be energized in selected pairs to move the armature and thus the supporting arm through selected positions.

For other objects and advantages and for a more detailed disclosure of the invention, reference is to be had to the following description taken in conjunction with the accompanying drawings in which.

Figure 9:
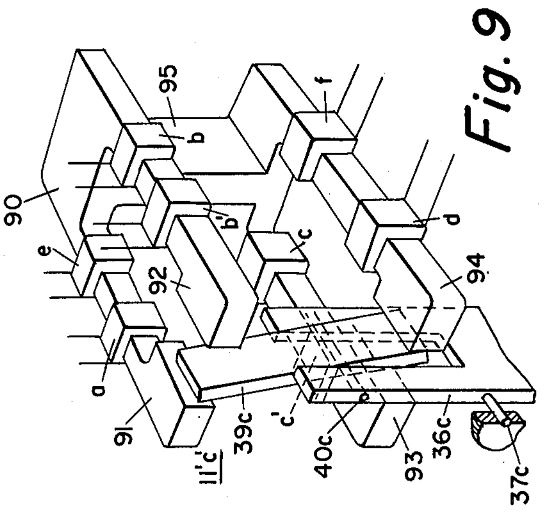
Figures 7, 8:
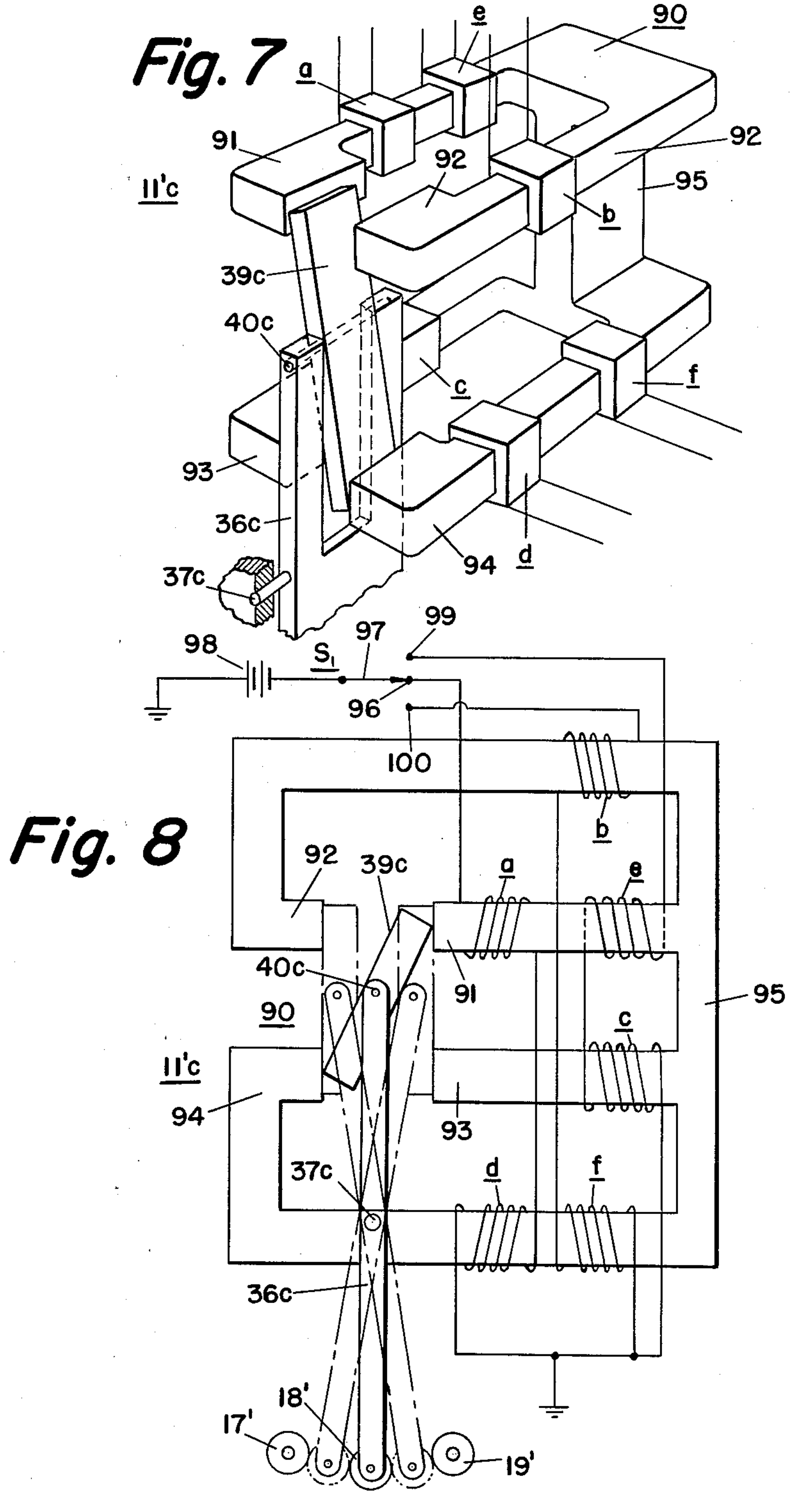
FIG. 7 is a perspective view of another modification of the invention.

FIG. 8 schematically illustrates the modification shown in FIG. 7 and its wiring diagram; and FIG. 9 is a perspective view of another modification similar to the modification shown in FIGS. 7 and 8.

Figure 1:
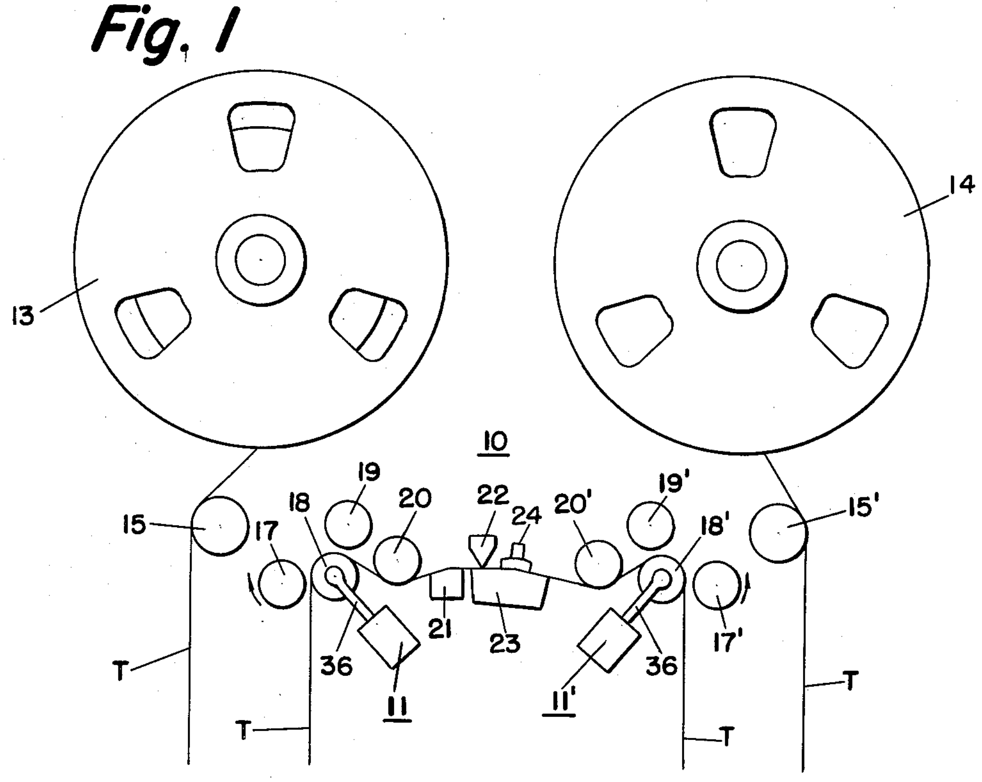
FIG. 1 is a diagrammatic view showing the present invention as applied to a magnetic tape unit.

Referring to FIG. 1, there is diagrammatically shown a magnetic tape drive unit 10 utilizing multi-position electromagnetic actuators 11 and 11' constructed in accordance with applicant's invention. The magnetic tape drive unit 10 includes a pair of reels 13 and 14, one of which serves as a supply for the tape T and the other of which serves as a take-up roll for the tape which is being unwound from the supply reel. The tape T is adapted to pass from reel 13 over a guide roll 15 into a vacuum column. The tape then passes between a backward drive capstan 17 and a pressure roller 18. A forward stop capstan 19 is disposed on the opposite side of the tape T from the pressure roller 18 and it will be noted that the pressure roller 18 is disposed in an intermediate position with respect to the backward drive capstan 17 and the forward stop capstan 19. The purpose of this will later be described. The tape T after leaving the pressure roller 18 passes under a tape guide 20, over a tape cleaner 21 and between an erase head 22 and a magnetic head 23. A pressure pad 24 is disposed on the same side of the tape as the erase head 22 and directly opposite the magnetic head 23. The tape T then passes under another tape guide 20' and over another pressure roller 18' which is similar to pressure roller 18. On the opposite side of the tape T from the pressure roller 18' are a backward stop capstan 19' and a forward drive capstan 17' which are similar to the forward stop capstan 19 and the backward drive capstan 17 respectively. The tape T then passes through a vacuum column and over a guide roll 15' to the take-up reel 14.

The drive capstans 17 and 17' are adapted to be driven in the direction of the arrows by suitable means, not shown. Depending upon the direction of tape movement, the pressure rollers 18 and 18' are adapted to be moved from their intermediate positions, as illustrated, into engagement wtih either of their corresponding drive capstans 17 and 17' or stop capstans 19 and 19'. Such movement is derived from the multi-position electromagnetic actuators 11, 11' as later to be described more in detail. When the tape T is driven forward, i.e., from reel 13 to reel 14, the left-hand pressure roller 18 serves as an idler which is driven by the tape and occupies the intermediate position as shown in FIG. 1. The right-hand pressure roller 18' is moved into engagement with the forward drive capstan 17' by the corresponding actuator 11'. To stop the forward drive of the tape T, the actuator 11 is operated and moves the pressure roller 18 against the forward stop capstan 19 and the actuator 11' moves the pressure roller 18' away from the forward drive capstan 17' to the intermediate position shown.

To reverse the movement of the tape, the actuator 11 is energized to move pressure roller 18 against the backward drive capstan 17 and the actuator 11' maintains the pressure roller 18' in the intermediate position where it is shown in FIG. 1. To stop the movement of the tape in the reverse or backward direction, the actuator 11' is energized to move the pressure roller 18' against the backward stop capstan 19' and the actuator 11 is energized to move the pressure roller 18 away from engagement with the backward drive capstan 17.

Figure 2:
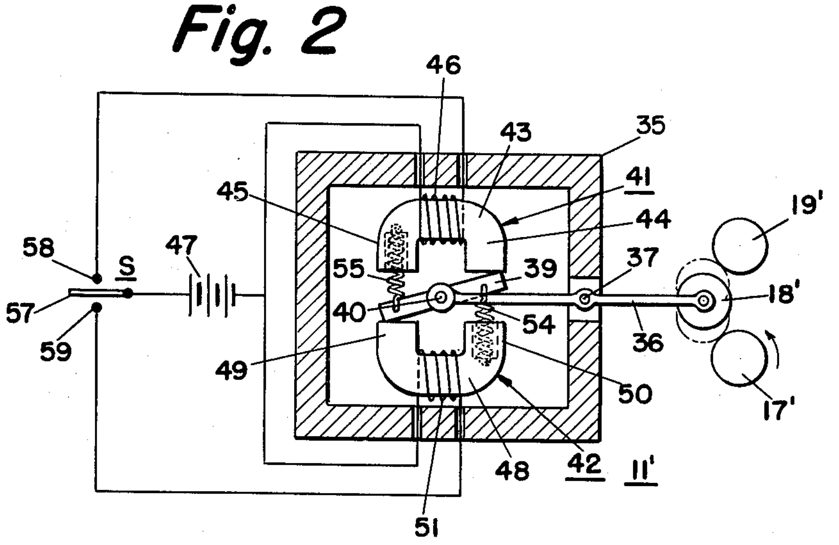
FIG. 2 is a diagrammatic view of a multi-position electromagnetic actuator embodying the present invention.

Referring to FIG. 2, there is schematically illustrated one form of the multi-position electromagnetic actuators 11 and 11'. It will of course be understood that the details of the actuators 11 and 11', FIG. 1, are exactly the same, the only difference being that one is a left-hand unit, whereas the other is a right-hand unit. For that reason, it is believed sufficient to describe the details of only one of the units, namely the right-hand unit 11'. The actuator 11', FIG. 2, includes a support 35 on which there is mounted an arm 36 by a pivot 37. The arm 36, at the outer end thereof, is adapted to pivotally support the pressure roller 18'. The opposite end of the pivoted arm 36 supports an armature 39 by a pivot 40. It will be noted that the pivot 40 extends through the center of the armature 39. The armature 39 is adapted for movement between a pair of magnets 41 and 42, one magnet being disposed on either side of the armature 39. The magnet 41 comprises a core member 43 which is U-shaped and includes a pair of poles 44 and 45. An electric coil 46 is wound on the core 43 and is adapted to be energized from a suitable source illustrated as battery 47. The magnet 42 is similar to magnet 41 and includes a U-shaped core 48 having a pair of poles 49 and 50 and a coil 51 wound thereon.

The armature 39 is adapted to be held in a diagonal position as shown in FIG. 2 by means of a pair of coil springs 54 and 55. Spring 54 is adapted to extend into a counterbore in pole 50 of magnet 42 and normally holds the corresponding end of armature 39 against pole 44 of magnet 41. The spring 55 is adapted to extend into a counterbore in pole 45 of magnet 41 and normally holds the corresponding end of armature 39 against pole 49 of magnet 42. Thus when the coils 46 and 51 of magnets 41 and 42 are deenergized, as shown in FIG. 2, the armature 39 assumes a diagonal position. With the armature 39 in this position, the pivotal connection 40 between the armature 39 and the arm 36 will occupy a central position between the magnets 41 and 42. Thus the pressure roller 18' likewise will occupy a central position between the backward stop capstan 19' and the forward drive capstan 17'. To drive the tape in a forward direction, it is necessary to move the pressure roller 18' against the forward drive capstan 17'. This is accomplished by moving a movable contact 57 of three-position switch S into engagement with a contact 58, thereby completing a circuit from a battery 47 to the coil 46 for energization of the magnet 41. This causes both ends of the armature 39 to be drawn against the respective poles 44 and 45 of magnet 41 thereby pivoting the arm 36 about its pivot 37 and moving the pressure roller 18' against the drive capstan 17'. The pressure roller 18' will remain in this position as long as the electromagnet 41 remains energized. When the movable contact 57 of switch S is moved to its intermediate position, FIG. 2, the magnet 41 will be deenergized thereby releasing the armature 39 and permitting the latter to assume its diagonal position under the influence of the springs 54 and 55 thus returning the pressure roller 18' to its intermediate or neutral position. When the movable contact 57 of switch S is moved into engagement with contact 59, the circuit from the battery 47 through the coil 51 will be completed thereby energizing the electromagnet 42 and causing the armature 39 to move into engagement with the poles 49 and 50. Such action compresses the spring 54 causing arm 36 to rotate about pivot 37 moving the pressure roller 18' into engagement with the backward stop capstan 19'.

Figure 3:
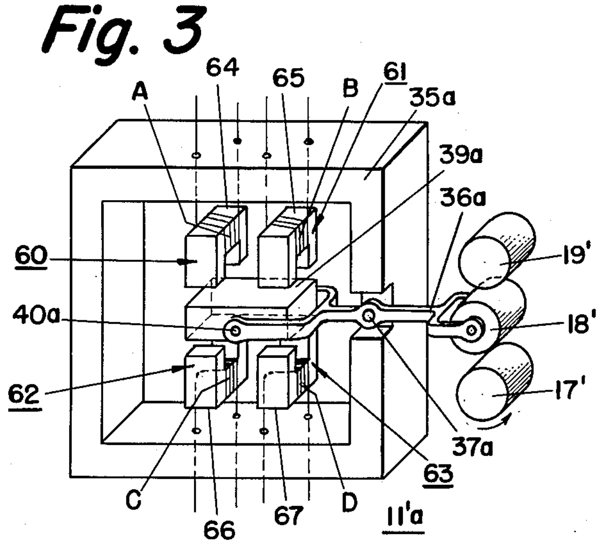
FIG. 3 is a modification of the invention.

Referring to FIG. 3, there is illustrated a modification of the multi-position electromagnetic actuators 11, 11' such modification being designated by reference character 11'a. The actuator 11'a is similar to actuators 11 and 11' in that it includes a support 35a, and arm 36a pivoted thereon at 37a, an armature 39a disposed at one end thereof and the pressure roller 18' disposed at the opposite end thereof. In this modification, the biasing springs 54 and 55 of FIG. 2 have been eliminated and the magnets 41 and 42 have been replaced by two pairs of electromagnets 60, 61 and 62, 63, one pair disposed on either side of the armature 39a. Each of the magnets 60–63 preferably is of the U-shaped type including cores 64–67 having poles which are adapted to be engaged by the armature 39a. Each of the cores 64–67 has wound thereon coils A–D respectively. The coils A–D are adapted to be selectively energized in pairs to control the position of the armature 39a which in turn controls the position of arm 36a and thus the position of the pressure roller 18' with respect to the tape capstans 19' and 17'.

Figure 4:
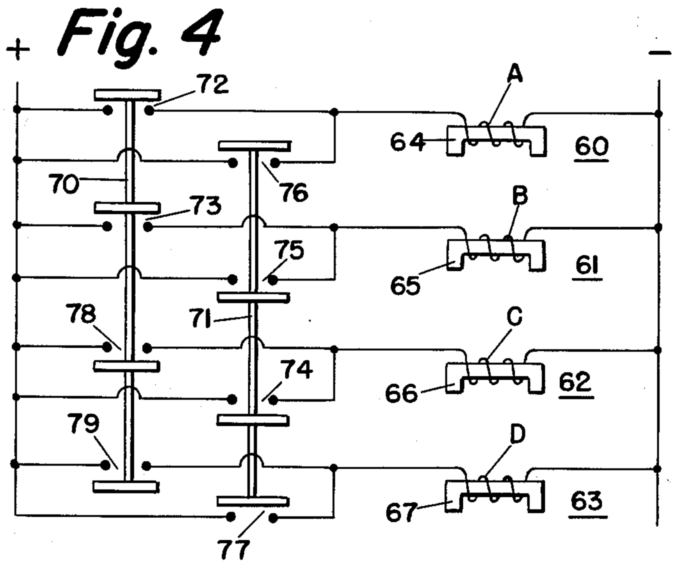
FIG. 4 is a schematic wiring diagram of the modification shown in FIG. 3.

Referring to FIG. 4, there is schematically illustrated an electrical circuit for controlling the selective energization of the coils A–D for the respective electromagnets 60—63. With the movable contactors 70 and 71 in the position illustrated, FIG. 4, none of the coils A–D is energized and thus the armature 39a, FIG. 3, has been illustrated in a floating position. To move the pressure roller 18' against the drive capstan 17', the contactor 70, FIG. 4, is moved downwardly closing the contacts 72 and 73 to complete the electrical circuit from a suitable source of power such as a battery, not shown, through the coils A and B of magnets 60 and 61. This causes the armature 39a, FIG. 3, to be attracted to the poles of the upper magnets 60 and 61 thereby pivoting the arm 36a about its pivot 37a, and moving the pressure roller 18' against the forward drive capstan 17'. To move the pressure roller 18' to an intermediate or neutral position, the contactor 70 is returned to its open position as shown in FIG. 4 and the contactor 71 may be either moved up or down to close contacts 74 and 75 or to close contacts 76 and 77. When contacts 74 and 75 are closed, coils B and C of electromagnets 61 and 62 are energized thus causing the armature 39a to assume a diagonal position engaging the pole faces of cores 65 and 66. When contacts 76 and 77 are closed, the coils A and D of electromagnets 60 and 63 are energized, thus causing the armature 39a to assume a diagonal position with the ends thereof in engagement with the pole faces of cores 64 and 67. Since the pivot 40a for the armature on the arm 36a is located centrally with respect to the ends of the armature 39a, it will be seen that the arm 36a will occupy the same intermediate position between the capstans 19' and 17' regardless of which diagonal position is assumed by the armature 39a.

To move the pressure roller 18' against the stop capstan 19', the contactor 70 is moved upwardly closing the contacts 78 and 79 to complete the electrical circuit through the coils C and D of magnets 62 and 63. This causes the armature 39a, FIG. 3, to be attracted to the poles of the lower magnets 62 and 63 thereby pivoting the arm 36a about its pivot 37a and moving the pressure roller 18' against the stop capstan 19'.

Figure 5:
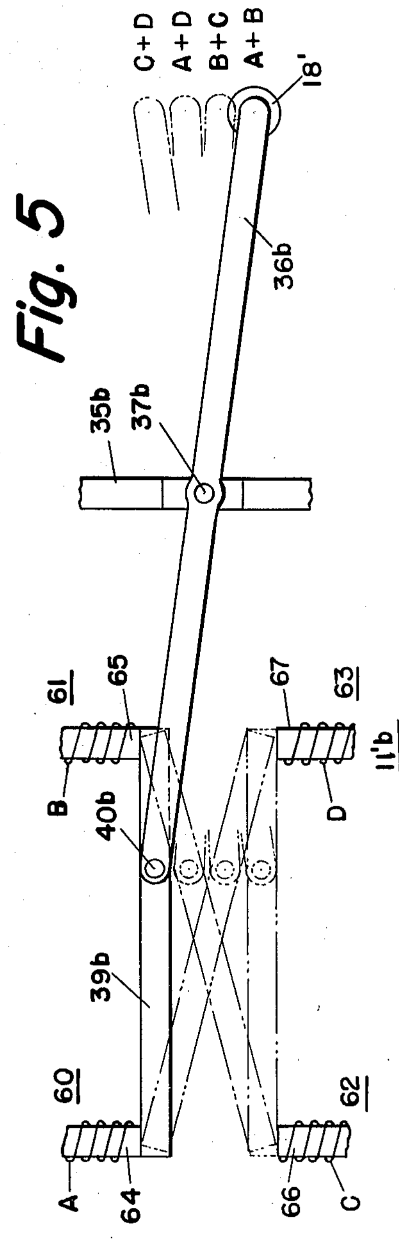
FIG. 5 is another modification of the invention illustrating a four-position actuator.

By moving the pivot for the armature so that it no longer passes through the center of the armature, it will be seen, FIG. 5, that the supporting arm 36a can be made to assume four different positions. In FIG. 5 there is diagrammatically illustrated an electromagnetic actuator 11'b which has four positions for the actuator arm 36b. The various parts of the actuator 11'b in FIG. 5 are identical with those of the actuator 11'a shown in FIG. 3 and therefore have been identified with corresponding reference characters. The only change in the construction is that the pivot 40b for the armature 39b does not pass through the center of the armature 39b, but instead is located to one side of the center.

Figure 6:
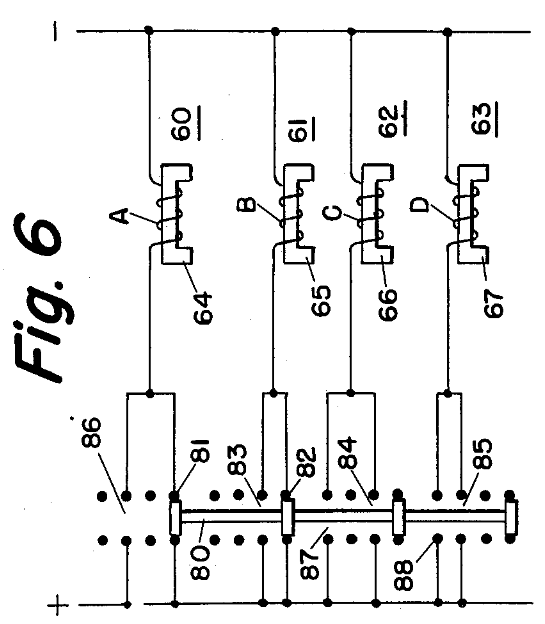
FIG. 6 is a schematic wiring diagram of the modification shown in FIG. 5.

With the electrical contactor arrangement illustrated in FIG. 4, the coils A–D of the electromagnets can be energized in four selected order of pairs. For example, it is possible to energize coils A and B and then coils C and D merely by moving the contactor 70 between its extreme positions and without moving the contactor 71. Likewise, it is possible to energize coils B and C and coils A and D merely by moving contactor 71 between its extreme positions. In the schematic circuit arrangement shown in FIG. 6, a single contactor 80 is employed and the contacts 81–88 thereof are arranged in such fashion that the actuator arm 36b, FIG. 5, will move from its full line position progressively upward through the three phantom line positions. In the full line position illustrated, as $(A+B)$ the coils A and B are both energized. This is accomplished by closing contacts 81 and 82 as shown in FIG. 6. To move the actuator arm 36b to its next position, illustrated as $(B+C)$, the coils B and C are adapted to be energized by raising the contactor 80 thereby closing the contacts 83 and 84 and concurrently opening contacts 81 and 82 to deenergize coil A. In this position the armature 39b will engage the poles of cores 65 and 66. To move the actuator arm 36b to the next intermediate position illustrated as $(A+D)$, the contactor 80, FIG. 6, is raised to its third position thereby closing contacts 85 and 86 which energizes the coils A and D of magnets 60 and 63. This causes the armature 39b to engage the poles of cores 64 and 67 as the contacts 83 and 84 are concurrently opened thereby deenergizing coils B and C. To move the actuator arm 36b to its uppermost position, identified as $(C+D)$, the contactor 80 likewise is moved to its uppermost position, FIG. 6, thereby closing the contacts 87 and 88 which completes the circuit through coils C and D energizing the respective electromagnets 62 and 63. This causes the armature 39b to move into engagement with the pole faces of cores 66 and 67 as the contacts 85 and 86 concurrently are opened thereby deenergizing coil A.

Referring to FIG. 7, there is illustrated another modification of the multi-position electromagnetic actuator, such modification being designated by reference character 11′c. The actuator 11′c is similar to the actuators 11′a and 11′b in that the operation of its armature 39c is dependent solely upon electrical means and not electromechanical means as in the case of actuator 11′ shown in FIG. 2. As may be seen in FIG. 7, the actuator 11′c is provided with a magnetic core structure 90 which includes a plurality of magnetic cores or legs 91–94 which are joined together by interconnecting support structure 95. The entire magnetic core structure 90, including the various parts 91–95 thereof, is made from a suitable magnetic material, such for example as laminated soft iron. The armature 39c is pivotally mounted at 40c on the end of an arm 36c which in turn is pivoted at 37c to a support on the stationary machine frame. The opposite end of the arm 36c is adapted to support the pressure roller 18′, FIG. 8, as in the previous modifications. Each of the core legs 91–94 is provided with a coil or winding *a–d* respectively and in additional cores 91 and 94 includes coils or windings *e* and *f* respectively. Thus it will be seen that the cores or legs 92 and 93 have only one winding while the diagonally opposite cores or legs 91 and 94 have two windings.

The modification shown in perspective in FIG. 7 has been illustrated schematically in FIG. 8 to more clearly show the electrical connections of the coils or windings *a–f* and the various positions of the armature 39c and the arm 36c. As may be seen in FIG. 8, the winding *a* on core 91 and the winding *d* on core 94 are connected in series between ground and a stationary contact 96 of a three-position selector switch S1. The movable contact 97 of the selector switch S1 is connected to one side of a battery 98, the other side of which is connected to ground. With the selector switch S1 in the position illustrated, the coils *a* and *d* are energized from the battery 98, thereby producing a flux path extending from leg 91 through section 95 of the magnetic core structure 90, through leg 94, and back through the armature 39c to complete a loop to leg 91. This maintains the armature 39c in the diagonal position illustrated in full line in FIG. 8 and maintains the pivoted arm 36c and thus pressure roller 18′ in an intermediate position between drive capstan 17′ and stop capstan 19′.

To move pressure roller 18′ into engagement with drive capstan 17′, the movable contact 97 of switch S1 is moved into engagement with a stationary contact 99 which is in series with winding *e* on leg 91 and winding *c* on leg 93. This energizes windings *e* and *c* from source 98 and provides a flux path extending from leg 91 through connecting section 95, through leg 93 and back through the armature 39c to complete a loop to leg 91. This causes the armature 39c to assume a vertical position as shown in FIG. 8, engaging the ends of both of poles 91 and 93 thereby causing the arm 36c to pivot about its pivot 37c and move the pressure roller 18′ against the drive capstan 17′. To move the pressure roller 18′ against the stop capstan 19′, the movable contact 97 of switch S1 is moved into engagement with the stationary contact 100 which is in series with coil *b* on leg 92 and coil *f* on leg 94. This causes the coils *b* and *f* to be energized from the battery 98 thereby creating a flux path extending from leg 92 through section 95, through leg 94, and through the armature 39c to complete a loop to leg 92. This causes the armature 39c to assume a position engaging the pole faces of the legs or cores 92 and 94 thereby rotating the arm 36c about pivot 37c and moving the pressure roller 18′ into engagement with the stop capstan 19′.

By providing a magnetic structure 90 which includes a plurality of pairs of integral legs of magnetic cores 91–94, there is provided a compact structure in which the poles are permanently positioned with respect to each other without the need of additional support. By using additional windings or coils on diagonally opposite poles, it is possible to simplify the switching circuits but at the same time to maintain a completely electrical system for controlling movement of the position of the armature 39c and the pivoted arm 36c. While only two of the legs or cores of the magnetic structure have been provided with two windings as shown in FIGS. 7 and 8, it is of course understood that the other two legs or cores may also be provided with two windings and the armature 36c pivoted at an off-center location, such for example as shown in FIG. 9, so that the actuator arm 36c may assume four positions rather than three positions, as illustrated in FIG. 8. It will be noted that the various windings A–F have been placed on their respective legs of magnetic core 90 in such a manner that the flux paths through the core structure 90 will maintain the same direction. By maintaining the same direction for the flux wherever possible, any time lag due to flux reversal is kept to a minimum.

While there have been shown and described and pointed out the fundamental features of the invention as applied to preferred embodiments, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A multi-position electromagnetic actuator comprising a support, an arm pivoted intermediate the ends thereof to said support, an armature pivoted intermediate the ends thereof to said arm at a location spaced from the pivotal connection of said arm to said support, two pairs of magnetic poles, one pair on either side of said armature, means for maintaining said armature in a diagonal position with one end thereof in engagement with one of said poles of each said pair of said magnetic poles to maintain said arm in a central position, and electrical means effective on said pairs of poles and selectively energized to move said armature into engagement with either pair of said pairs of poles to move said arm about its pivot in opposite directions to positions on either side of said central position.

2. A multi-position electromagnetic actuator according to claim 1 wherein each of said pairs of said magnetic poles comprises a substantially U-shaped core.

3. A multi-position electromagnetic actuator according to claim 1 wherein said means for maintaining said armature in a diagonal position comprises spring means engaging the opposite ends of said armature at opposite sides thereof.

4. A multi-position electromagnetic actuator according to claim 1 wherein said magnetic poles comprise individual cores each having an electrical coil.

5. A multi-position electromagnetic actuator according to claim 1 wherein said armature is pivoted at a central location intermediate the ends thereof to provide three operating positions for said arm.

6. A multi-position electromagnetic actuator according to claim 1 wherein said armature is pivoted at an off-center location to provide four operating positions for said arm.

7. A multi-position electromagnetic actuator according to claim 1 wherein said means for maintaining said armature in a diagonal position comprises electrical winding means cooperating with a first pole of said pair of poles on one side of said armature and a second pole of said pair of poles on the other side of said armature, said first and second poles being disposed diagonally opposite each other.

8. A multi-position electromagnetic actuator comprising an arm having a fixed pivot intermediate the ends thereof, an armature pivoted intermediate the ends thereof to said arm at a location spaced from said fixed pivot, a pair of magnetic poles disposed on one side of said armature, a second pair of magnetic poles disposed on the opposite side of said armature, said armature being adapted for limited pivotal movement between said pairs of magnetic poles, means for maintaining said armature in a diagonal position with one end thereof in engagement of one of said poles of each said pair of said magnetic poles to maintain said arm in a predetermined position, and electrical winding means on each of said pairs of poles and adapted for selective energization to move said armature into engagement with either pair of said pairs of poles thereby moving said arm about its pivot in opposite directions to positions on either side of said predetermined position.

9. A multi-position electromagnetic actuator according to claim 8 wherein said means for maintaining said armature in a diagonal position comprises magnetic means adapted to be rendered ineffective upon energization of said electrical winding means.

10. A multi-position electromagnetic actuator comprising an arm having a fixed pivot intermediate the ends thereof, an armature pivoted intermediate the ends thereof to said arm at a location spaced from said fixed pivot, a pair of magnetic cores disposed on one side of said armature, a second pair of magnetic cores disposed on the opposite side of said armature, an electrical winding disposed on each of said magnetic cores, and means for energizing said windings in selected pairs to actuate said armature for moving said arm to at least three different positions.

11. A multi-position electromagnetic actuator according to claim 10 wherein said armature is pivoted at a non-central location to said arm so that said arm is movable to four different positions by operation of said armature.

12. A multi-position electromagnetic actuator according to claim 10 wherein one of said magnetic cores of each of said pairs includes an additional electrical winding for moving said arm to one of said positions.

13. A multi-position electromagnetic actuator comprising an arm having a fixed pivot intermediate the ends thereof, an armature pivoted intermediate the ends thereof to said arm at a location spaced from said fixed pivot, a pair of magnetic poles disposed on one side of said armature, a second pair of magnetic poles disposed on the other side of said armature, and means for maintaining said armature in the diagonal position with one end thereof in engagement with one of said poles of each of said pair of said magnetic poles to maintain said arm in a neutral position, and electrical energizing means effective on said pairs of poles to move said armature into engagement with either pair of said pairs of poles to move said arm about its fixed pivot in opposite directions to predetermined positions on either side of said neutral position.

14. A multi-position electromagnetic actuator according to claim 13 wherein said means for maintaining said armature in a diagonal position comprises mechanical means for biasing said armature in said diagonal position.

15. A multi-position electromagnetic actuator according to claim 13 where said means for maintaining said armature in a diagonal position comprises means for energizing a diagonally opposite pair of said magnetic poles.

16. A multi-position electromagnetic actuator according to claim 13 wherein said means for maintaining said armature in a diagonal position comprises electrical winding means cooperating with a first pole of said pair of poles on one side of said armature and a second pole of said pair of poles on the other side of said armature, said first and second poles being disposed diagonally opposite each other.

17. A multi-position electromagnetic actuator comprising support structure, an arm pivoted intermediate the ends thereof to said support structure, an armature pivoted intermediate the ends thereof to said arm at a location spaced from the pivotal connection of said arm to said support structure, magnetic core structure including at lease two pairs of magnetic poles, one pair arranged on either side of said armature, and three pairs of electrical windings, said windings being disposed on said magnetic core structure with respect to said pairs of magnetic poles whereby energization of one pair of windings maintains said armature in a diagonal position with one end thereof in engagement with one of said poles of each said pair of said magnetic poles to maintain said arm in a central position and the selective energization of said other electrical windings moves said armature into engagement with either pair of said pairs of poles to move said arm about its pivot in opposite directions to positions on either side of said central position.

18. A multi-position electromagnetic actuator comprising an arm having a fixed pivot intermediate the ends thereof, an armature pivoted intermediate the ends thereof to said arm at a location spaced from said fixed pivot, magnetic core structure including at least two pairs of magnetic poles, one of said pair disposed on one side of said armature and a second of said pairs disposed on the opposite side of said armature, electrical winding means disposed on said magnetic core structure and associated with said poles, and means for selectively energizing said electrical winding means to provide at least three different flux paths through said magnetic core structure and effective on said armature for moving said arm to at least three different positions.

References Cited in the file of this patent

UNITED STATES PATENTS

| | | |
|---|---|---|
| 2,792,217 | Weidenhammer et al. | May 14, 1957 |
| 2,803,968 | Van Tilburg | Aug. 27, 1957 |
| 2,877,012 | Angel et al. | Mar. 10, 1959 |